United States Patent
Patel

(10) Patent No.: US 12,464,585 B2
(45) Date of Patent: *Nov. 4, 2025

(54) DUAL CONNECTIVITY AND CARRIER AGGREGATION BAND SELECTION

(71) Applicant: T-Mobile USA, Inc., Bellevue, WA (US)

(72) Inventor: Nishant Patel, Irvine, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 140 days.

This patent is subject to a terminal disclaimer.

(21) Appl. No.: 18/332,228

(22) Filed: Jun. 9, 2023

(65) Prior Publication Data

US 2023/0328824 A1    Oct. 12, 2023

Related U.S. Application Data

(63) Continuation of application No. 17/376,655, filed on Jul. 15, 2021, now Pat. No. 11,711,862.

(51) Int. Cl.
*H04W 72/0453* (2023.01)
*H04W 76/15* (2018.01)

(52) U.S. Cl.
CPC ....... *H04W 76/15* (2018.02); *H04W 72/0453* (2013.01)

(58) Field of Classification Search
None
See application file for complete search history.

(56) References Cited

U.S. PATENT DOCUMENTS

| | | |
|---|---|---|
| 6,058,307 A | 5/2000 | Garner |
| 6,134,443 A | 10/2000 | Spann et al. |
| 6,751,444 B1 | 6/2004 | Meiyappan |
| 6,754,266 B2 | 6/2004 | Bahl et al. |
| 6,985,461 B2 | 1/2006 | Singh |
| 7,599,693 B2 | 10/2009 | Kuriyama |
| 7,885,246 B2 | 2/2011 | Kuroda et al. |

(Continued)

FOREIGN PATENT DOCUMENTS

| | | |
|---|---|---|
| CN | 105075370 A | 11/2015 |
| CN | 109871816 A | 6/2019 |

(Continued)

*Primary Examiner* — The Hy Nguyen
(74) *Attorney, Agent, or Firm* — Perkins Coie LLP

(57) ABSTRACT

The disclosed technology provides a system and method for allocating frequency bands to a mobile device or user equipment (UE) based on priorities assigned to the different frequency bands. When no priority is assigned to the frequency bands, when a special or reserved priority is assigned, or when equal priority is assigned, the frequency band allocation to the UE is based on a default frequency allocation algorithm (e.g., based on a relative bandwidth of the different frequency bands). When a UE is capable of utilizing a first and a second frequency band, and the priority assigned to the first frequency band is higher than the priority assigned to the second frequency band, the network (e.g., eNB/gNB) overrides the default algorithm and preferentially allocates the first frequency band to UE even when the first frequency band has a smaller bandwidth than the second frequency band or when the default algorithm would otherwise prefer the first frequency band.

13 Claims, 4 Drawing Sheets

(56) References Cited

U.S. PATENT DOCUMENTS

| | | |
|---|---|---|
| 8,351,414 B2 | 1/2013 | Kashiwagi et al. |
| 8,423,019 B2 | 4/2013 | Rao |
| 8,478,282 B2 | 7/2013 | Gupta et al. |
| 8,493,922 B2 | 7/2013 | Li et al. |
| 8,547,939 B1 | 10/2013 | Vargantwar |
| 8,731,606 B2 | 5/2014 | Yoshihara et al. |
| 8,737,992 B1 | 5/2014 | Haub et al. |
| 8,781,486 B1 | 7/2014 | Choi et al. |
| 8,855,081 B2 | 10/2014 | Winters et al. |
| 8,897,799 B2 | 11/2014 | Tsunekawa et al. |
| 8,909,241 B2 | 12/2014 | Villardi et al. |
| 8,929,561 B2 | 1/2015 | Holland et al. |
| 9,055,608 B2 | 6/2015 | Kotecha et al. |
| 9,112,663 B2 | 8/2015 | Nakashima et al. |
| 9,203,528 B2 | 12/2015 | Zheng et al. |
| 9,232,516 B1 | 1/2016 | Oroskar et al. |
| 9,307,474 B2 | 4/2016 | Tailor et al. |
| 9,432,131 B2 | 8/2016 | Lindoff et al. |
| 9,439,202 B1 | 9/2016 | Hou et al. |
| 9,445,421 B2 | 9/2016 | Levine et al. |
| 9,474,071 B2 | 10/2016 | Dahlen |
| 9,516,549 B1 | 12/2016 | Aksu |
| 9,554,287 B2 | 1/2017 | Beale |
| 9,596,586 B2 | 3/2017 | Zander |
| 9,629,046 B2 | 4/2017 | Hapsari et al. |
| 9,647,819 B2 | 5/2017 | Teng et al. |
| 9,661,670 B2 | 5/2017 | Chan et al. |
| 9,706,442 B2 | 7/2017 | Hageltorn et al. |
| 9,706,485 B2 | 7/2017 | Namboodiri et al. |
| 9,706,538 B1 | 7/2017 | Oroskar et al. |
| 9,729,283 B2 | 8/2017 | Kwon et al. |
| 9,729,304 B2 | 8/2017 | Lindoff et al. |
| 9,756,611 B2 | 9/2017 | Yavuz et al. |
| 9,780,856 B2 | 10/2017 | Cai |
| 9,794,804 B2 | 10/2017 | Sriram et al. |
| 9,867,206 B2 | 1/2018 | Zitzmann et al. |
| 9,883,405 B2 | 1/2018 | Soulie |
| 9,913,172 B2 | 3/2018 | Huang et al. |
| 9,942,896 B2 | 4/2018 | Chandwani et al. |
| 9,992,784 B2 | 6/2018 | Chen et al. |
| 10,057,811 B2 | 8/2018 | Hassan et al. |
| 10,057,910 B2 | 8/2018 | Hassan et al. |
| 10,117,264 B2 | 10/2018 | Ohta et al. |
| 10,135,579 B2 | 11/2018 | Andreoli-fang et al. |
| 10,149,106 B2 | 12/2018 | Furuichi et al. |
| 10,201,000 B2 | 2/2019 | Cheng et al. |
| 10,212,605 B2 | 2/2019 | Teng et al. |
| 10,257,830 B2 | 4/2019 | Chandwani et al. |
| 10,264,533 B2 | 4/2019 | Wang et al. |
| 10,341,818 B2 | 7/2019 | Vutukuri et al. |
| 10,362,469 B2 | 7/2019 | Sennett et al. |
| 10,375,711 B2 | 8/2019 | Sadek et al. |
| 10,433,244 B2 | 10/2019 | Song et al. |
| 10,462,805 B2 | 10/2019 | Belghoul et al. |
| 10,536,944 B2 | 1/2020 | Zhang et al. |
| 10,582,394 B2 | 3/2020 | Narayanan et al. |
| 10,588,129 B2 | 3/2020 | Karimli et al. |
| 10,615,886 B2 | 4/2020 | Peitzer et al. |
| 10,701,608 B2 | 6/2020 | Kakinada et al. |
| 10,701,750 B2 | 6/2020 | Kaliaperumal et al. |
| 10,757,733 B2 | 8/2020 | Dhanapal et al. |
| 10,791,479 B2 | 9/2020 | Vargantwar et al. |
| 10,873,861 B2 | 12/2020 | Furuichi |
| 10,893,448 B2 | 1/2021 | Panchal et al. |
| 10,966,248 B2 | 3/2021 | Shikari et al. |
| 11,711,862 B1* | 7/2023 | Patel ................. H04W 76/15 370/329 |
| 2003/0125039 A1 | 7/2003 | Lachtar et al. |
| 2005/0075125 A1 | 4/2005 | Bada et al. |
| 2006/0160551 A1 | 7/2006 | Matoba et al. |
| 2007/0142046 A1 | 6/2007 | Welnick |
| 2007/0149229 A1 | 6/2007 | Frederiksen et al. |
| 2008/0069275 A1 | 3/2008 | Horiguchi et al. |
| 2009/0318124 A1 | 12/2009 | Haughn |
| 2010/0296405 A1 | 11/2010 | Madan et al. |
| 2012/0115468 A1 | 5/2012 | Lindoff et al. |
| 2013/0022007 A1* | 1/2013 | Berggren ................. H04L 5/001 370/329 |
| 2013/0195078 A1 | 8/2013 | Kobayashi et al. |
| 2013/0244656 A1 | 9/2013 | Heo et al. |
| 2013/0258962 A1 | 10/2013 | Oota |
| 2015/0334765 A1 | 11/2015 | Rahman et al. |
| 2016/0029248 A1 | 1/2016 | Syed et al. |
| 2016/0381572 A1 | 12/2016 | Shahar et al. |
| 2017/0161092 A1* | 6/2017 | Harper ................. G06F 9/45558 |
| 2018/0242234 A1 | 8/2018 | Semaan et al. |
| 2018/0262377 A1* | 9/2018 | Liu ..................... H04L 5/0057 |
| 2018/0288805 A1 | 10/2018 | Bhorkar et al. |
| 2018/0317231 A1 | 11/2018 | Wang et al. |
| 2019/0098643 A1 | 3/2019 | Kronestedt et al. |
| 2019/0132846 A1 | 5/2019 | Yong |
| 2019/0222339 A1 | 7/2019 | Badic et al. |
| 2020/0008108 A1 | 1/2020 | Yoo et al. |
| 2020/0029347 A1 | 1/2020 | Huang et al. |
| 2020/0037320 A1 | 1/2020 | Karimli et al. |
| 2020/0037321 A1 | 1/2020 | Karimli et al. |
| 2020/0059963 A1 | 2/2020 | Damnjanovic et al. |
| 2020/0127692 A1 | 4/2020 | Zhang et al. |
| 2020/0221469 A1 | 7/2020 | Lee et al. |
| 2020/0314836 A1 | 10/2020 | Xu et al. |
| 2020/0351643 A1 | 11/2020 | Dhanapal et al. |
| 2020/0367241 A1* | 11/2020 | Hosseini ........... H04W 72/0453 |
| 2021/0058221 A1 | 2/2021 | Taneja et al. |
| 2021/0068077 A1 | 3/2021 | Raghavan et al. |
| 2021/0075901 A1 | 3/2021 | Ahluwalia et al. |
| 2021/0176674 A1 | 6/2021 | Jung et al. |
| 2021/0185699 A1 | 6/2021 | Alasti et al. |
| 2022/0124714 A1* | 4/2022 | Raghavan ............ H04B 7/0456 |

FOREIGN PATENT DOCUMENTS

| | | |
|---|---|---|
| CN | 111953376 A | 11/2020 |
| CN | 109075878 B | 1/2021 |
| CN | 112188513 A | 1/2021 |
| CN | 112272386 A | 1/2021 |
| CN | 112335244 A | 2/2021 |
| CN | 112367152 A | 2/2021 |
| CN | 112400348 A | 2/2021 |
| CN | 112512121 A | 3/2021 |
| CN | 110100466 B | 6/2021 |
| CN | 112911654 A | 6/2021 |
| EP | 0865222 B1 | 5/2007 |
| EP | 2786625 A1 | 10/2014 |
| EP | 2564613 B1 | 4/2015 |
| EP | 2883405 A2 | 6/2015 |
| EP | 2485519 B1 | 10/2016 |
| EP | 3202076 A1 | 8/2017 |
| EP | 3210425 A1 | 8/2017 |
| EP | 3104655 B1 | 5/2019 |
| EP | 3711381 A1 | 9/2020 |
| JP | 2011205326 A | 10/2011 |
| JP | 4901582 B2 | 1/2012 |
| JP | 5183539 B2 | 1/2013 |
| JP | 2014183409 A | 9/2014 |
| JP | 5967884 B2 | 7/2016 |
| JP | 5958694 B2 | 8/2016 |
| JP | 2016194431 A | 11/2016 |
| KR | 20080076263 A | 8/2008 |
| KR | 100980648 B1 | 9/2010 |
| KR | 101335363 B1 | 12/2013 |
| KR | 101380582 B1 | 4/2014 |
| KR | 101547060 B1 | 8/2015 |
| KR | 20170048144 A | 5/2017 |
| KR | 20200143055 A | 12/2020 |
| WO | 2005065035 A2 | 7/2005 |
| WO | 2010087334 A1 | 8/2010 |
| WO | 2012006887 A1 | 1/2012 |
| WO | 2013097144 A1 | 7/2013 |
| WO | 2016186742 A1 | 11/2016 |
| WO | 2017030487 A1 | 2/2017 |
| WO | 2017105408 A1 | 6/2017 |
| WO | 2018176500 A1 | 10/2018 |
| WO | 2018223049 A1 | 12/2018 |
| WO | 2020131886 A1 | 6/2020 |

(56) References Cited

FOREIGN PATENT DOCUMENTS

| WO | 2020147824 A1 | 7/2020 |
|----|---------------|--------|
| WO | 2020164101 A1 | 8/2020 |
| WO | 2020164592 A1 | 8/2020 |
| WO | 2021032829 A1 | 2/2021 |
| WO | 2021104039 A1 | 6/2021 |

* cited by examiner

DUAL CONNECTIVITY AND CARRIER AGGREGATION BAND SELECTION

CROSS-REFERENCE TO RELATED APPLICATIONS

This application is a continuation of U.S. patent application Ser. No. 17/376,655, filed on Jul. 15, 2021, entitled DUAL CONNECTIVITY AND CARRIER AGGREGATION BAND SELECTION, which is hereby incorporated by reference in its entirety.

BACKGROUND

Cellular operators, e.g., Long-term Evolution (LTE) or New Radio (NR) operators can have licenses to multiple different frequency bands where each frequency band can have a different carrier bandwidth. To increase capacity, the cellular operators can deploy carrier aggregation (CA) or dual-connectivity (DC), where mobile devices or user equipment (UE) compatible with CA or DC can simultaneously utilize one or more component carriers (CCs) in the different frequency bands for downlink (DL) and/or uplink (UL) transmissions.

Depending on the positions of the utilized component carriers, carrier aggregation can include: (1) the case where the CCs are contiguous in the same frequency band, i.e., intra-band contiguous CA; (2) the case where the CCs are in the same frequency band but are separated by a gap, i.e., intra-band non-contiguous CA; and, (3) the case where the CCs are in different frequency bands, i.e., inter-band CA.

Similar to CA, DC utilizes the radio resource within multiple CCs to improve UE throughput. The difference between DC and CA is in the application scenarios and hence the implementation. For example, CA can be employed where the backhaul between nodes (e.g., eNBs/gNBs) is ideal, while DC can be used for non-ideal backhaul, e.g., relatively large delay between nodes. DC allows the UE to simultaneously transmit and receive data on multiple component carriers from two serving nodes or cell groups, a master node, MN (e.g., a master eNB/gNB), and a secondary node, SN (e.g., secondary eNB/gNB). DC can operate between two serving nodes operating in the same radio access technology (RAT), e.g., both NR or both LTE, or operating in different RATs, such as MN operating in LTE while SN is operating in NR, or vice versa. For example, using an LTE MN and NR SN (i.e., Evolved Universal Mobile Telecommunications System Terrestrial Radio Access Network (EUTRAN) NR dual connectivity (EN-DC)) allows networks to employ both 4G LTE and 5G NR to increase user throughput by utilizing the wide 5G spectrum while providing the UE with a wider coverage from the 4G spectrum.

3GPP standards, for example, dictate the allowed DC or CA band combinations are allowed. However, it is up to the operator to determine, based for example on the licensed or unlicensed frequency spectrum available to the operator, what CCs in what frequency bands to assign to UEs. It is beneficial that the operator's networks (e.g., the eNB/gNBs) make this allocation while making the most efficient use of the available spectrum.

BRIEF DESCRIPTION OF THE DRAWINGS

Detailed descriptions of implementations of the present invention will be described and explained through the use of the accompanying drawings.

Figure 1:
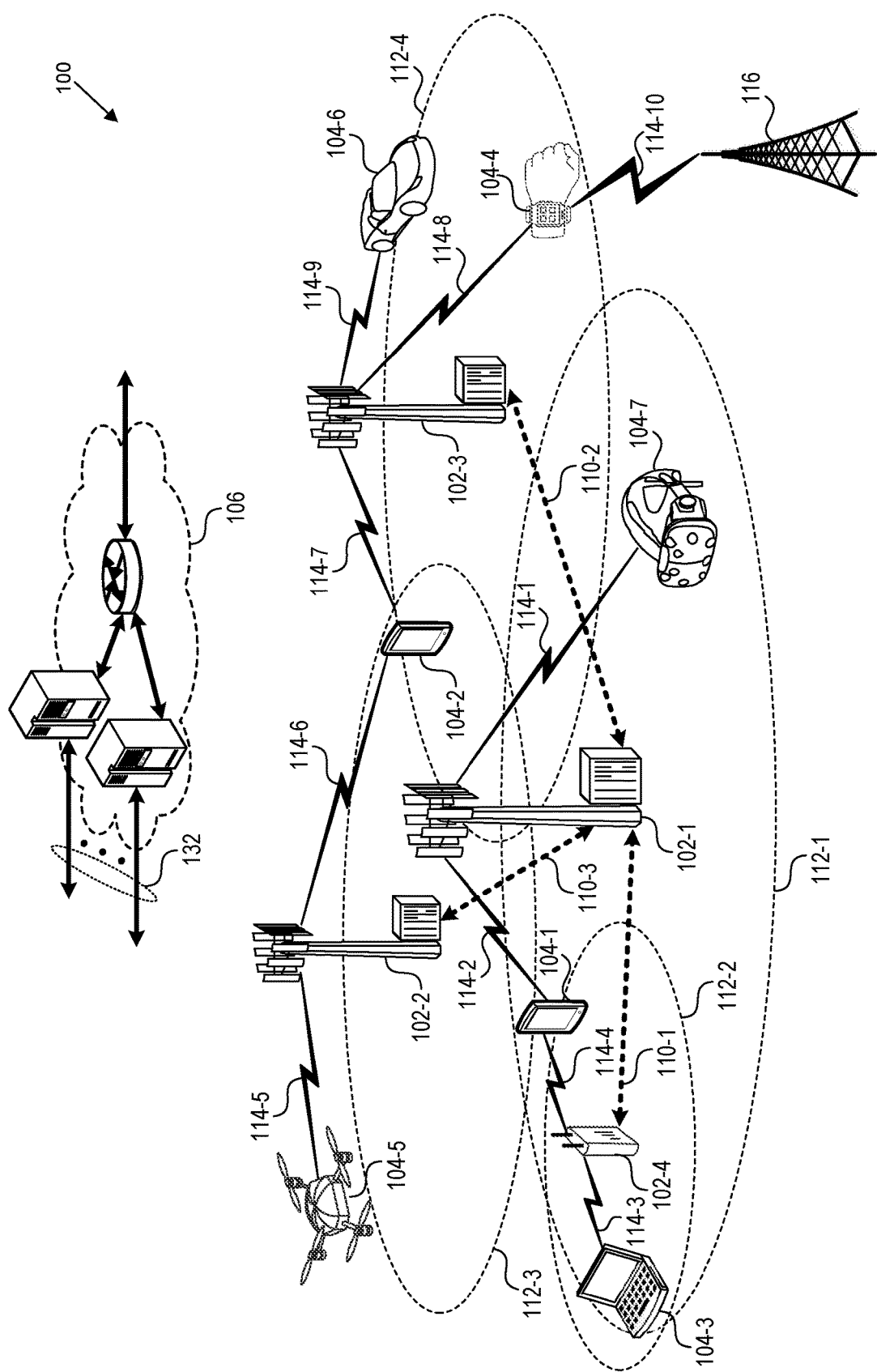
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In one aspect of the disclosed technology, a network node, e.g., an LTE eNB or NR gNB, determines priorities assigned to different frequency bands that a mobile device or user equipment (UE) is capable of utilizing for carrier aggregation (CA), NR dual connectivity (NR DC) or LTE-NR dual connectivity (EN-DC). If for example, a first frequency band has a higher assigned priority than a second frequency band, the network node preferentially allocates the first frequency band to the UE for use as a secondary component carrier. This allocation overrides a default RAN-vendor-specific (or base-station-hardware-specific) allocation algorithm that could, for example, preferentially allocate frequency bands with larger carrier bandwidths (BWs).

If no priority is assigned to any of the frequency bands or component carriers supported by the UE, or if the same priority is assigned to the frequency bands or component carriers, the network node allocates the frequency bands to the UE according to the default allocation algorithm. Certain special or reserve network priorities can be used to either revert to the default algorithm, or to remove the frequency band or component carriers from consideration altogether in the operator-specific frequency band allocation algorithm.

In another aspect of the disclosed technology, a self-optimizing network or self-organizing network (SON) can be configured to determine the relative priorities of the frequency bands or component carriers that the UE is compatible with. For example, the SON can evaluate different key process indicators (KPIs) associated with traffic in the different frequency bands and dynamically or automatically determine the relative priorities of the frequency bands (e.g., in real-time).

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over an LTE/LTE-A communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Computer System

Figure 2:
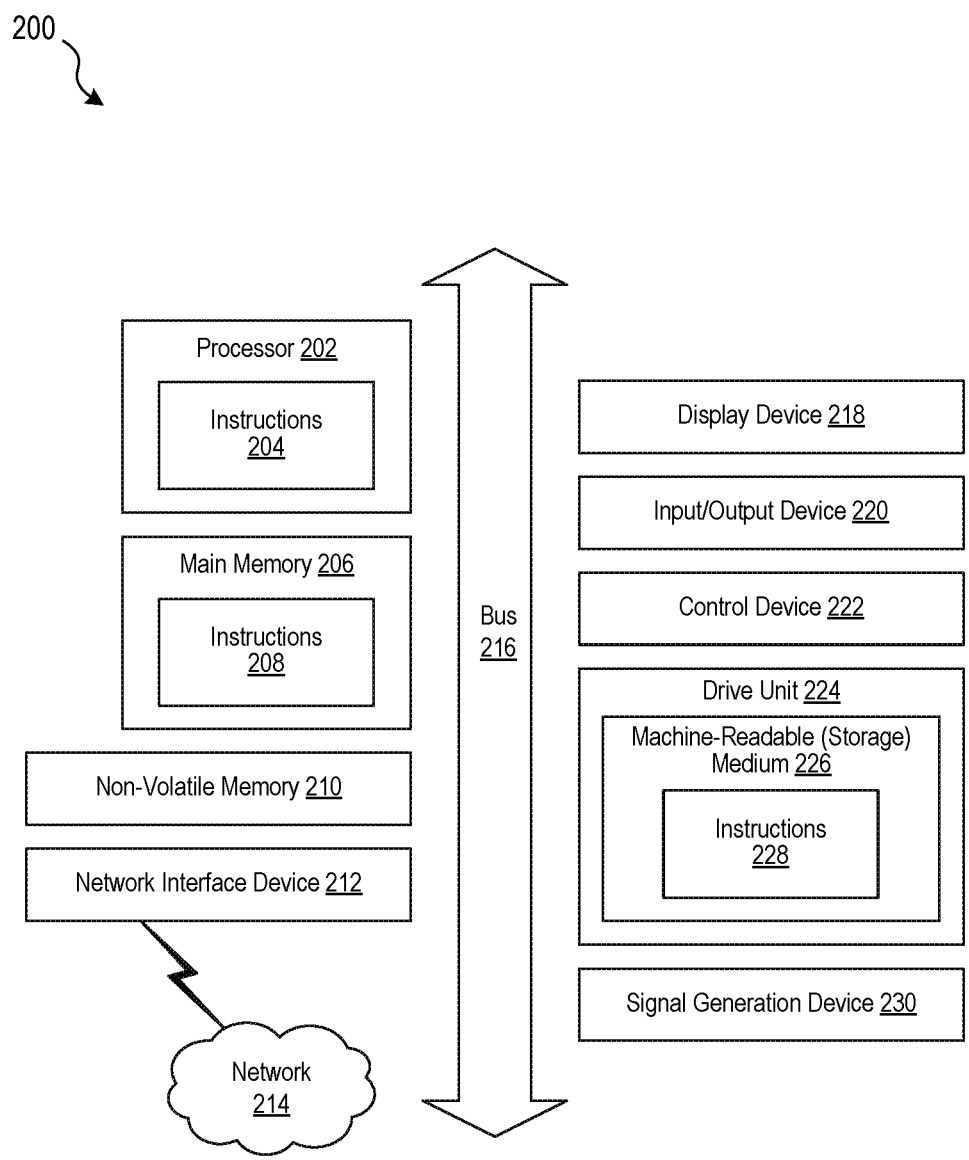
FIG. 2 is a block diagram that illustrates an example of a computer system in which at least some operations described herein can be implemented.

FIG. 2 is a block diagram that illustrates an example of a computer system 200 in which at least some operations described herein can be implemented. As shown, the computer system 200 can include: one or more processors 202, main memory 206, non-volatile memory 210, a network interface device 212, video display device 218, an input/output device 220, a control device 222 (e.g., keyboard and pointing device), a drive unit 224 that includes a storage medium 226, and a signal generation device 230 that are communicatively connected to a bus 216. The bus 216 represents one or more physical buses and/or point-to-point connections that are connected by appropriate bridges, adapters, or controllers. Various common components (e.g., cache memory) are omitted from FIG. 2 for brevity. Instead, the computer system 200 is intended to illustrate a hardware device on which components illustrated or described relative to the examples of the figures and any other components described in this specification can be implemented.

The computer system 200 can take any suitable physical form. For example, the computing system 200 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 200. In some implementation, the computer system 200 can be an embedded computer system, a system-on-chip (SOC), a single-board computer system (SBC) or a distributed system such as a mesh of computer systems or include one or more cloud components in one or more networks. Where appropriate, one or more computer systems 200 can perform operations in real-time, near real-time, or in batch mode.

The network interface device 212 enables the computing system 200 to mediate data in a network 214 with an entity that is external to the computing system 200 through any communication protocol supported by the computing system 200 and the external entity. Examples of the network interface device 212 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 206, non-volatile memory 210, machine-readable medium 226) can be local, remote, or distributed. Although shown as a single medium, the machine-readable medium 226 can include multiple media (e.g., a centralized/distributed database and/or associated caches and servers) that store one or more sets of instructions 228. The machine-readable (storage) medium 226 can include any medium that can store, encoding, or carrying a set of instructions for execution by the computing system 200. The machine-readable medium 226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 204, 208, 228) set at various times in various memory and storage devices in computing device(s). When read and executed by the processor 202, the instruction(s) cause the computing system 200 to perform operations to execute elements involving the various aspects of the disclosure.

Priority-Based NR DC/CA Band Assignment

Figure 3:
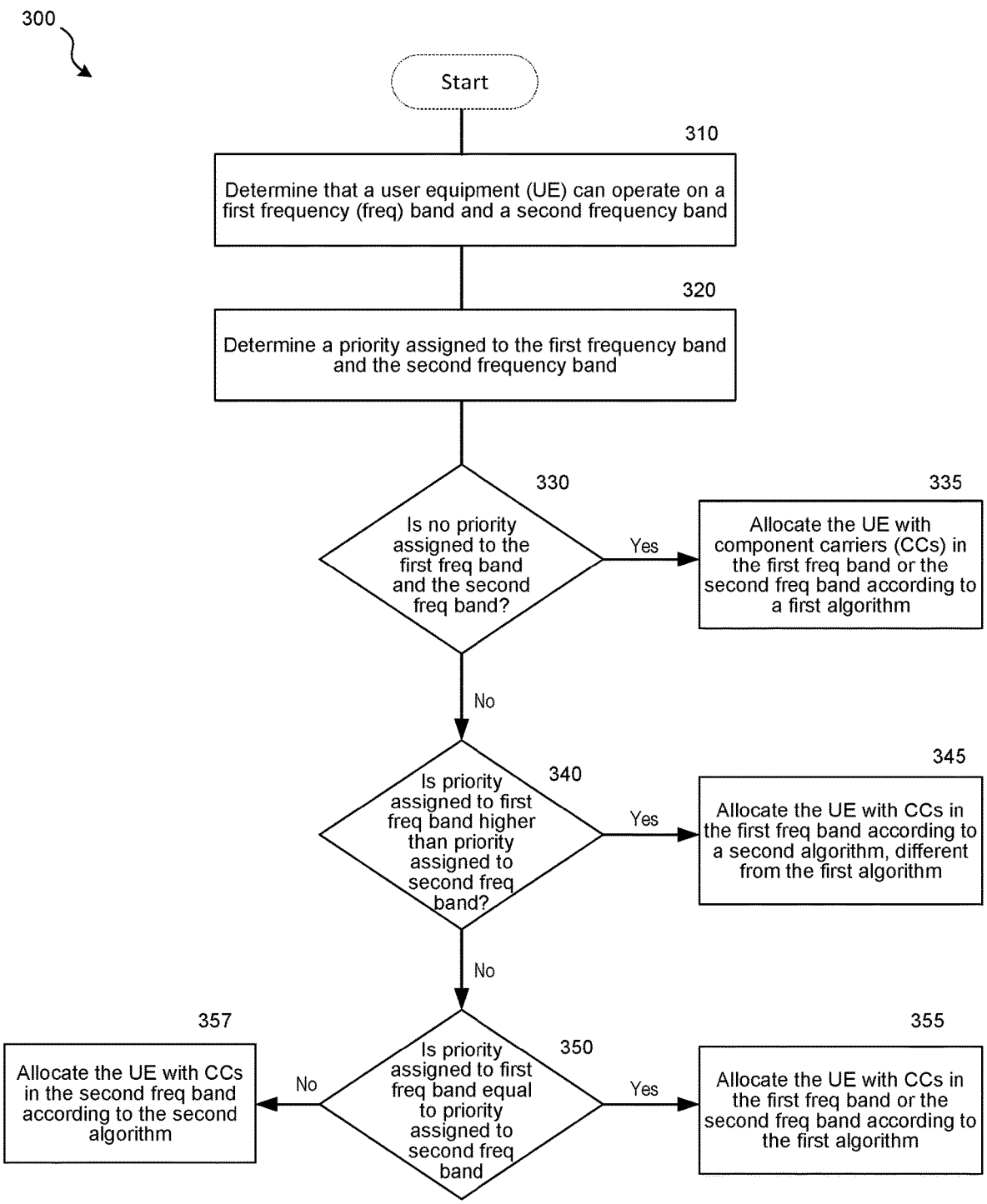
FIG. 3 is a flowchart that illustrates selecting frequency bands for use by a mobile device based on assigned priorities of the frequency bands.

FIG. 3 is a flowchart 300 that illustrates selecting frequency bands for use by a mobile device based on assigned priorities of the frequency bands. At block 310, a network (e.g., a network node such as an eNB in LTE networks or a gNB in NR networks) determines which frequency bands the mobile device or user equipment (UE) can operate on. For example, if the cellular operator has licenses to two frequency bands, a first frequency band and a second frequency band, the network at block 310 can determine if a UE is capable of operating in these two frequency bands. This determination can be based on, for example, UE capability exchange messages.

Because cellular operators can have licenses or agreements to multiple LTE or NR frequency bands (including access to unlicensed frequency bands), and each frequency band can have different bandwidths, 3GPP standards specify the different combinations of frequency bands and component carriers that UEs can use for carrier aggregation (CA) and dual connectivity (DC) modes. However, within these allowed DC/CA band combos, it is up to the network implementation to determine what component carriers (CCs) in what frequency bands to allocate UEs for CA or DC. That is, 3GPP standards to not specify how an enB or gNB should select carriers. For example, the network can prioritize frequency bands with a larger carrier bandwidth (BW) over frequency bands with narrower or smaller BWs so as to maximum the aggregate bandwidth and hence the data rate per user.

Where the radio access network (RAN) vendor (e.g., eNB/gNB base station equipment vendor) provides an internal algorithm for allocating UEs with frequency bands or carriers, the cellular operator may not have insight into or control over the internal algorithm and may thus be unable to override the default determination of the frequency bands or carriers to preferentially allocate to UEs other frequency bands or carriers. For example, for CA, DC or EN-DC, the gNB's default internal algorithm could be configured to preferentially allocate UEs with frequency bands with a wider bandwidth ahead of frequency bands with a narrower bandwidth; or preferentially allocate the UEs with frequency bands with less traffic before frequency bands with heavy traffic. However, the cellular operator might prefer to override this allocation scheme and preferentially allocate UEs with a newly acquired frequency band which may have a lower bandwidth than existing (perhaps congested or heavily utilized) frequency bands with a wider bandwidth. For example, the operator might want to allocate to a UE an under-utilized and narrower sub-6 GHz (frequency range (FR) 1) NR frequency band in lieu of allocating a wider mmWave (frequency range 2) NR frequency band (e.g., for additional coverage or for a better utilization of the FR1 frequency band). The cellular operator (and not the RAN equipment vendor) might have better information to correctly prioritize frequency bands (e.g., light usage of a band because of few devices in the network that are compatible with that band) or might need a different prioritization or band allocation scheme than other operator customers of the RAN equipment vendor. It is therefore beneficial to have an ability for the operator to override the default frequency allocation scheme and assign priorities to different frequency bands, where the priorities determine which frequency bands or carriers the network will preferentially assign to a UE for CA or DC.

At block 320, the network can determine whether there is a priority assigned to the different frequency bands that the UE is capable of operating on. In some implementations, the RAN equipment vendor can provide a configuration portal to the base station hardware to allow the cellular operator to manually and/or statically assign a priority to each of the frequency bands. For example, the operator can allocate a first priority indicator indicating a higher priority to a first frequency band that the base station equipment (e.g., gNB) is to preferentially allocate to UEs, and a second priority indicator indicating a lower priority to a second frequency band that the base station equipment is to allocate to UEs at a lower priority.

In some implementations, the priority indicator can be a numeric value (e.g., Pr0 to Pr99) where a lower numeric value indicates a higher priority. It will be appreciated that the format in which the frequency bands and component carrier priority is indicated is arbitrary and different priority designations can be used to indicate the relative priority of allocation of different frequency bands and component carriers.

In some implementations, the base station equipment (e.g., eNB/gNB) can automatically and/or dynamically assign different priorities to different frequency bands as part of the eNB/gNBs self-optimizing/organizing network (SON) capability. For example, the gNB can analyze key process indicators (KPIs) or other characteristics associated with traffic in the different frequency bands including the number of connected users in the different frequency bands, downlink (DL) and uplink (UL) physical resource block (PRB) utilizations, etc. Based on these KPIs or characteristics, the network can allocate different priorities to the different frequency bands or component carriers. The eNB/gNB can also request the UE to send measurement reports for the different frequency bands allowing the gNB to assign different priorities to the different bands based on the radio frequency (RF) measurements over the different bands.

At block 330, if the network determines that none of the frequency bands that the UE can utilize have an assigned priority level, the network, at block 335, allocates the UE with component carriers (CCs) in any of the available/compatible frequency bands according to a default internal algorithm of the RAN hardware (e.g., the default frequency band or carrier allocation algorithm of the base station (eNB/gNB)). For example, if at block 310 the network determines that the UE can operate at a first frequency band and a second frequency band, and at block 330 the network determines that the operator or the SON has not assigned a priority indicator or priority level to either of the first and second frequency bands, the network at block 335 allocates either the first frequency band or the second frequency band to the UE according to a first algorithm (the RAN vendor default algorithm). In some implementations, the network can treat blank frequency bands (i.e., frequency bands or component carriers with no assigned priority levels) as having the lowest priority and allocate frequency bands to the UE based on the operator-specific algorithm when other frequency bands or component carriers have assigned priorities. In some implementations, if the network finds multiple frequency bands with no assigned priority levels, band assignment can be done based on the best theoretical throughput calculated based on the bandwidth of the frequency bands, the number of multi-input multi-output (MIMO) layers, and modulation and coding scheme.

If at block 330 the network determines that at least a priority is assigned to the first frequency band or the second frequency band or both the first and second frequency bands, the network determines at block 340 if the priority assigned to the first frequency band is higher than the priority assigned to the second frequency band (when the first frequency band and second frequency band have assigned priorities). If the priority assigned to the first frequency band is higher than the priority assigned to the second frequency band (e.g., if the first priority indicator associated with the first frequency band has a lower numeric value than the second priority indicator associated with the second frequency band), the network allocates the UE with CCs in the first frequency band according to a second algorithm (e.g., the operator-specific algorithm different from and configured to override the RAN vendor's default algorithm). In some implementations, if there are two frequency bands available and the first frequency band has no assigned priority but the second frequency band has an assigned priority, the network can assign the second frequency band as the primary component carrier (primary cell) and the first frequency band as the secondary component carrier (secondary cell).

If at block 350 the network determines that the priority assigned to the first frequency band is equal to the priority assigned to the second frequency band (i.e., the priority of the frequency bands is the same or tied), the network at block 355 utilizes the RAN vendor's default algorithm (e.g., the first algorithm) and allocates the UEs with CCs in the first or second frequency bands accordingly. The network operator can thus allow the continued use of the RAN vendors default allocation algorithm for certain frequency bands by either not allocating any priorities to the frequency bands or by allocating the frequency bands to the same priority (e.g., assigning the same priority indicator value).

The network at block 357 allocates the UE with CC in the second frequency band according to the second algorithm (e.g., the operator overriding algorithm) if at block 350 the network determines that the priority assigned to the first frequency band is not equal to the priority assigned to the second frequency band (e.g., the priority of the first frequency band is lower than the priority of the second frequency band).

In some implementations, a first special or reserved priority indicator can be used to designate that the associated frequency band is to be allocated according to the default RAN vendor algorithm (e.g., the first algorithm). The cellular operator can therefore assign this priority indicator to frequency bands or component carriers that the operator does not care to prioritize higher or lower when the network is allocating the frequency bands.

In some implementations, a second special or reserved priority indicator can be used to remove the frequency band for component carrier from circulation or use, thereby indicating to the network that the frequency band or component carrier should not be considered in allocating frequency bands or CCs to the UE. That is, if an operator does not wish to allocate a certain frequency band or CC to a DC/CA secondary cell (secondary component carrier), the operator can assign that frequency band or component carrier with the second special or reserved priority indicator. The operator can thus use this priority indicator to reserve a frequency band or CC for use by a primary cell (primary component carrier).

In some implementations, the same priority indicator can be used to determine a frequency allocation for CA and for DC. In other implementations, a different priority indicator can be used to determine a frequency allocation for DC than the priority indicator used to determine the frequency allocation for CA.

In some implementations, different component carriers (CCs) in the same frequency band can be assigned different priorities (e.g., based on the bandwidth or the CCs or based on some other operator-specific criteria). The network can allocate the different CCs to the UEs based on the assigned priorities as described above. For example, the network can use a default allocation algorithm when CCs have no assigned priority, when they have the same assigned priority, or when they are assigned a first special or reserved priority. The network can use a different allocation algorithm when CCs have assigned priorities, favoring CCs with a higher assigned priority over those with a lower assigned priority.

Figure 4:
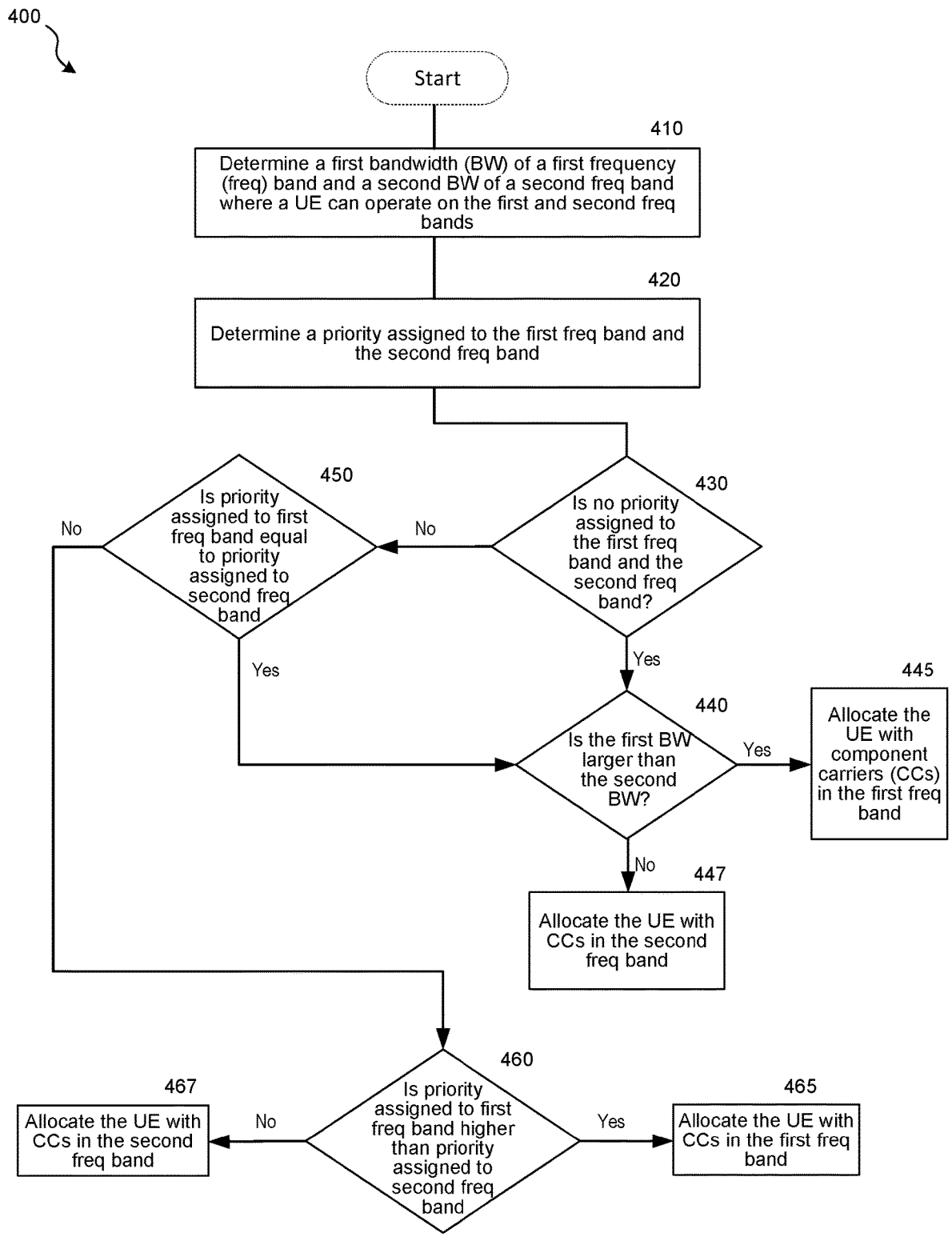
FIG. 4 is a flowchart that illustrates selecting frequency bands for use by a mobile device based on assigned priorities and carrier bandwidths of the frequency bands.

FIG. 4 is a flowchart 400 that illustrates selecting frequency bands for use by a mobile device based on assigned priorities and carrier bandwidths of the frequency bands.

At block 410, the network can determine bandwidths associated with different frequency bands or different component carriers that the UE can operator on. For example, the network can determine a first bandwidth (BW) of a first frequency band and a second bandwidth of a second frequency band. In some implementations, the bandwidths associated with different frequency bands can be statically stored in a memory in the network node (e.g., in the eNB/gNB) and the frequency bands or component carriers (or combinations thereof) that the UE can support can be determined by UE capability exchange messages.

At block 420, the network determines a priority assigned to the different frequency bands, e.g., the first and second frequency bands.

At block 430, if there is no priority assigned to any of the frequency bands (or any of the frequency bands supported by the UE or otherwise available to allocate to the UE), the network allocates frequency bands based on a default internal algorithm as described above in relation to FIG. 3. For example, at block 440 the network can determine if the first BW determined at block 410 is larger than the second BW and if it is, the network at block 445 can allocate the UE with CCs in the first frequency band. If, however, the first BW is not larger than the second BW, the network at block 447 can allocate the UE with CCs in the second frequency band if the first BW is smaller than the second BW, or can randomly allocate the first or second frequency band to the UE or use other allocation criteria as described below if the first BW is equal to the second BW.

At block 450, the network determines if the priority assigned to the first frequency band is equal to the priority assigned to the second frequency band. If it is, the network determines the frequency allocation based on the default algorithm, e.g., based on the relative size of the BW of the first and second frequency bands in block 440.

If the priority assigned to the first frequency band is not equal to the priority assigned to the second frequency band, the network determines at block 460 if the priority assigned to the first frequency band is higher than the priority assigned to the second frequency band.

At block 465, the network allocates UEs with CCs in the first frequency band if the priority assigned to the first frequency band is higher than the priority assigned to the second frequency band.

At block 467, the network allocates UEs with CCs in the second frequency band if the priority assigned to the first frequency band is not higher than the priority assigned to the second frequency band.

In some implementations, the priority of different frequency bands (either based on the default frequency allocation or the operator-specific frequency allocation scheme) can be based on other characteristics of the frequency bands other than the available bandwidth. For example, the priority can be based on radio frequency (RF) characteristics determined from UE measurements in the different frequency bands; can be based on traffic characteristics or historical utilization of the different frequency bands; can be based on band combinations already allocated to the UE with the goal of reducing intermodulation distortion (IMD) products on certain frequency band combinations; can be based on application or quality of service requested by the UE, for example, high throughput applications can favor higher bandwidth channels and wide coverage applications (e.g., IoT applications) can favor low frequency bands, etc. For example, for a cell-edge UE, the network can determine that the UE cannot reliably use certain frequency bands with otherwise high priority assignment given the RF propagation properties of those frequency bands. Such frequency bands can be disregarded or deprioritized in the frequency allocation to the UE. That is, in some implementations, the operator-specific frequency allocation schemes described above are used after the network determines that the frequency bands are otherwise reliable or good enough to use by the UE.

In some implementations, the frequency allocation schemes described above are transparent to the UE. That is, they are only used by the eNB/gNB to assign secondary cell to the UE in, for example, an RRC Reconfiguration message. For example, when the UE sends capability messages to the gNB, the gNB could instruct the UE to send measurement reports on different frequency bands, and the gNB uses these measurements reports to determine priority indicators that are used to allocate frequency bands or component carriers to the UE transparently to the UE.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. An apparatus, comprising:
   determining means for determining whether a priority indicator is assigned to first and second frequency bands;
   first allocation means for allocating a mobile device with component carriers (CCs) in the first frequency band or the second frequency band according to a first frequency allocation rule,
      wherein the first allocation means allocates CCs in the first or second frequency bands when no priority indicator is assigned to at least one of the first and second frequency bands, wherein the apparatus comprises a gNodeB (gNB) operating in a New Radio (NR) radio access network, and wherein the first frequency allocation rule is a default rule employed by the gNB; and second allocation means for allocating the mobile device with CCs in the first frequency band, wherein the second allocation means allocates CCs when a first priority indicator assigned to the first frequency band indicates a higher priority than a second priority indicator assigned to the second frequency band, wherein allocating the mobile device with the CCs in the first frequency band is according to a second frequency allocation rule, different from the first frequency allocation rule, and wherein the second frequency allocation rule is an override rule.

2. The apparatus of claim 1, further comprising:

means for allocating the mobile device with component carriers in the first frequency band or the second frequency band according to the first rule in response to determining that the first priority indicator assigned to the first frequency band indicates a same priority as a second priority indicator assigned to the second frequency band.

3. The apparatus of claim 1, further comprising:

means for allocating the mobile device with component carriers in the first frequency band or the second frequency band according to the first rule in response to determining that there is no priority indicator assigned to the first frequency band and the priority indicator assigned to the second frequency band indicates a first reserved priority indicator.

4. The apparatus of claim 1, further comprising:

means for allocating the mobile device with component carriers in the first frequency band according to the first rule in response to determining that there is no priority indicator assigned to the first frequency band and the priority indicator assigned to the second frequency band indicates a second reserved priority indicator, wherein the second reserved priority indicator indicates that the second frequency band should not be considered in allocating component carriers to the mobile device.

5. The apparatus of claim 1, wherein the first frequency band comprises a smaller bandwidth than the second frequency band.

6. The apparatus of claim 1, wherein the first priority indicator and the second priority indicator are based on one or more measurement reports of the first frequency band and the second frequency band.

7. The apparatus of claim 1, wherein the first priority indicator and the second priority indicator are assigned by a self-optimizing network (SON) configured to determine the priority indicator based on at least one characteristic of traffic on the first frequency band and the second frequency band, and wherein the at least one characteristic of: number of connected users, a downlink (DL) physical resource block (PRB) utilization, or an uplink (UL) PRB utilization.

8. An apparatus, comprising:

determining logic for determining whether a priority indicator is assigned to first and second frequency bands;

first allocation logic for allocating a mobile device with component carriers (CCs) in the first frequency band or the second frequency band according to a first frequency allocation rule, wherein the first allocation logic allocates CCs in the first or second frequency bands when no priority indicator is assigned to at least one of the first and second frequency bands, wherein the apparatus comprises a gNodeB (gNB) operating in a New Radio (NR) radio access network, and wherein the first rule is a default rule employed by the gNB; and second allocation logic for allocating the mobile device with CCs in the first frequency band, wherein the second allocation logic allocates CCs when a first priority indicator assigned to the first frequency band indicates a higher priority than a second priority indicator assigned to the second frequency band, wherein allocating the mobile device with the CCs in the first frequency band is according to a second frequency allocation rule, different from the first frequency allocation rule, and wherein the second frequency allocation rule is an override rule.

9. The apparatus of claim 8, further comprising:

logic for allocating the mobile device with component carriers in the first frequency band according to the first rule in response to determining that there is no priority indicator assigned to the first frequency band and the priority indicator assigned to the second frequency band indicates a second reserved priority indicator, wherein the second reserved priority indicator indicates that the second frequency band should not be considered in allocating component carriers to the mobile device.

10. The apparatus of claim 8, wherein the mobile device is configured to operate in a New Radio (NR) carrier aggregation mode, a NR dual connectivity mode, or an Evolved Universal Mobile Telecommunications System Terrestrial Radio Access Network (EUTRAN) NR dual connectivity (EN-DC) mode.

11. The apparatus of claim 8, wherein the first frequency band comprises a smaller bandwidth than the second frequency band.

12. The apparatus of claim 8, wherein the first priority indicator and the second priority indicator are based on one or more measurement reports of the first frequency band and the second frequency band.

13. The apparatus of claim 8, wherein the first priority indicator and the second priority indicator are assigned by a self-optimizing network (SON) configured to determine the priority indicator based on at least one characteristic of traffic on the first frequency band and the second frequency band, and wherein the at least one characteristic of: number of connected users, a downlink (DL) physical resource block (PRB) utilization, or an uplink (UL) PRB utilization.

* * * * *